United States Patent [19]
Lee

[11] Patent Number: 5,803,625
[45] Date of Patent: Sep. 8, 1998

[54] BAR CODE PRINTING DEVICE

[75] Inventor: Chih Jung Lee, Taipei Hsien, Taiwan

[73] Assignee: Taiwan Semiconductor Co., Ltd., Taipei Hsien, Taiwan

[21] Appl. No.: 696,641

[22] Filed: Aug. 12, 1996

[51] Int. Cl.[6] .................................................. B41J 5/00
[52] U.S. Cl. ...................... 400/103; 400/208; 400/225; 400/242; 400/243
[58] Field of Search ........................... 400/103, 88, 208, 400/208.1, 225, 242, 243

[56] References Cited

U.S. PATENT DOCUMENTS

| | | | |
|---|---|---|---|
| 4,924,242 | 5/1990 | Fukawa | 400/208 |
| 5,128,763 | 7/1992 | Sakuragi | 400/208 |
| 5,149,218 | 9/1992 | Iwatani et al. | 400/625 |
| 5,228,793 | 7/1993 | Ferrie | 400/208 |
| 5,295,753 | 3/1994 | Godo et al. | 400/88 |
| 5,536,093 | 7/1996 | Tomoda et al. | 400/242 |
| 5,547,183 | 8/1996 | Tamura | 400/208 |
| 5,553,952 | 9/1996 | Umbach | 242/129.71 |
| 5,562,352 | 10/1996 | Whritenor et al. | 400/208 |

*Primary Examiner*—Eugene H. Eickholt
*Attorney, Agent, or Firm*—Pro-Techtor International

[57] ABSTRACT

A bar code printing device including a base frame, a cover turned about a pivot in the base frame, torsional springs mounted around the pivot to force the cover outwards from the base frame, gear wheel and sector gear assemblies mounted between the base frame and the cover to buffer the spring force of the torsional springs, a sticker reel mounted in the base frame and turned by a step motor to let off a sticker for printing, a ribbon reel mount fastened to the cover on the outside, a ribbon reel mounted on the ribbon reel mount and turned by a DC motor through a reducing gear to turn a ribbon over the sticker, the ribbon reel having a tension spring adapted for adjusting the diameter of the ribbon reel subject to the size of the ribbon to be used, and a control circuit for controlling the operation of the DC motor and the step motor.

5 Claims, 6 Drawing Sheets

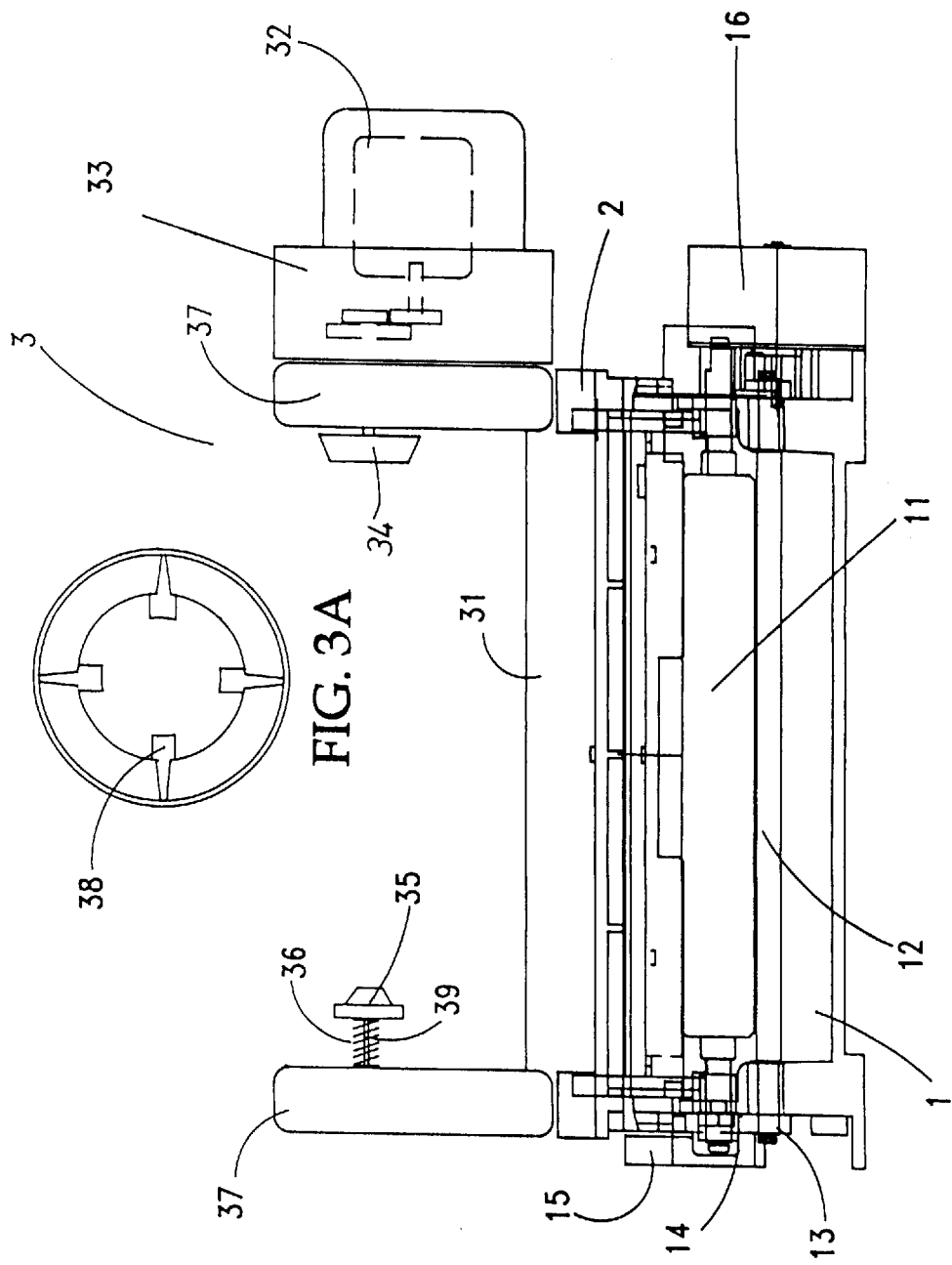

BAR CODE PRINTING DEVICE

BACKGROUND OF THE INVENTION

The present invention relates to bar code printing devices, and relates more particularly to such a bar code printing device which fits different ribbon reels.

Various bar code printing devices have been disclosed for printing bar codes on stickers. These bar code printing devices commonly comprise a base frame which holds a sticker reel, a cover pivoted to the base frame which holds a ribbon reel, a motor drive, and a transmission mechanism coupled between the motor drive, the sticker reel and the ribbon reel. Because the ribbon reel is designed for the loading of a specific ribbon, it does not accept any ribbon of different specification. Another drawback of conventional bar code printing devices is that the cover tend to escape out of the closed position. If the cover is not positively closed, the sticker cannot be positively taken up. Furthermore, because the ribbon reel and the sticker reel are linked together and turned at different revolving speeds, a matching error between the delivery of the sticker and the delivery of the ribbon tends to occur.

SUMMARY OF THE INVENTION

The present invention has been accomplished to provide a bar code printing device which eliminates the aforesaid drawbacks. According to one aspect of the present invention, the ribbon reel is turned by a DC motor through a reducing gear to turn a ribbon over the sticker, having a tension spring adapted for adjusting the diameter of the ribbon reel subject to the size of the ribbon to be used. According to another aspect of the present invention, the sticker reel is turned by a step motor to let off a sticker for printing, and a control circuit is provided for controlling the operation of the step motor and the operation of the DC motor to ensure. According to still another aspect of the present invention, torsional springs are provided to force the cover outwards from the base frame, hooks and retainers are respectively installed in the cover and the base frame for positively retaining the cover and the base frame in the closed position, and gear wheel and sector gear assemblies are mounted between the base frame and the cover to buffer the spring force of the torsional springs.

BRIEF DESCRIPTION OF THE DRAWINGS

FIG. 3 is a front plain view of the bar code printing device according to the present invention;

FIG. 3A is a front view in an enlarged scale of the wheel of the ribbon reel mount shown in FIG. 3A;

DETAILED DESCRIPTION OF THE PREFERRED EMBODIMENT

Figure 1:
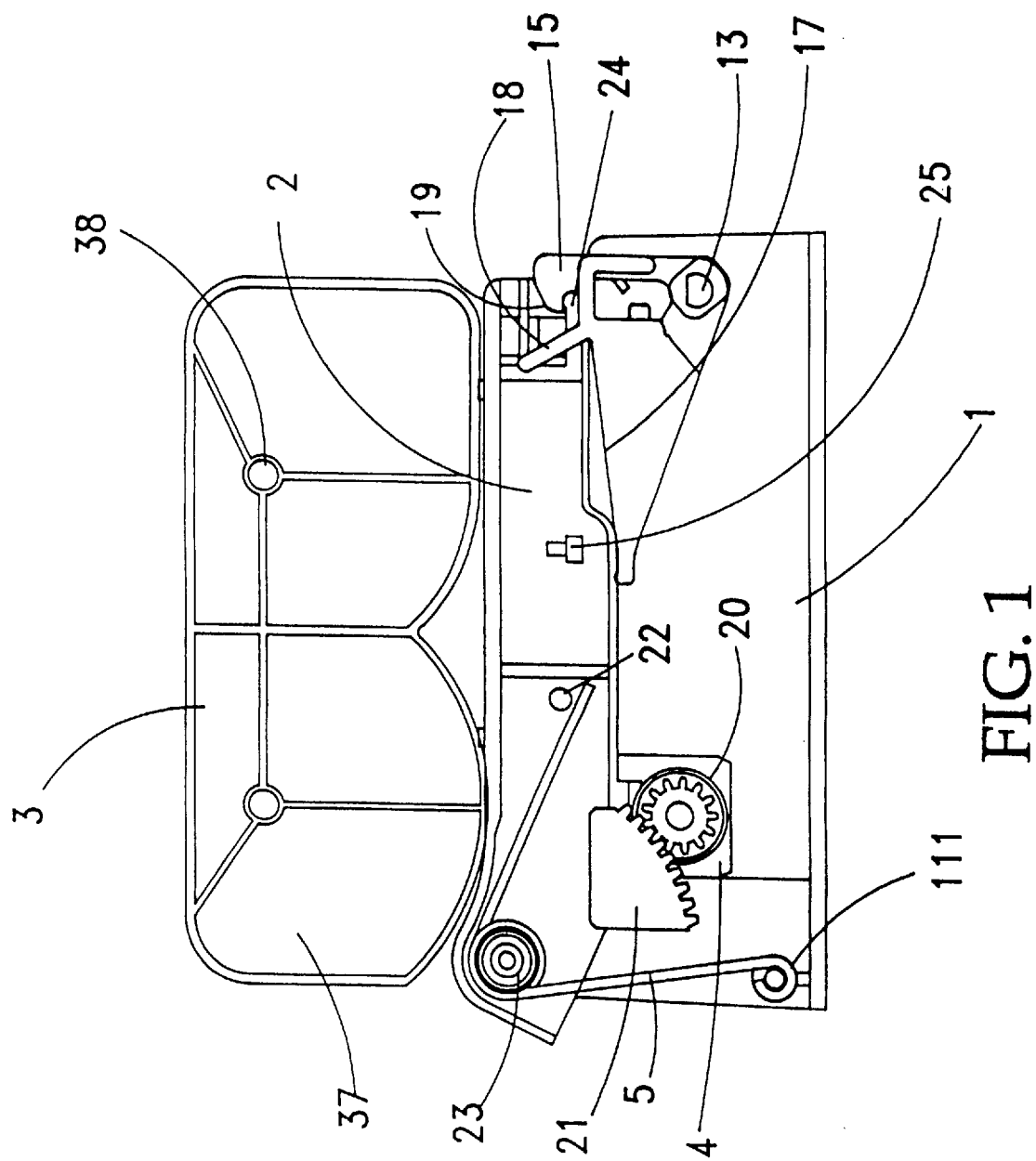
FIG. 1 is a side plain view of the present invention, showing the internal structure of the bar code printing device.
Figure 2:
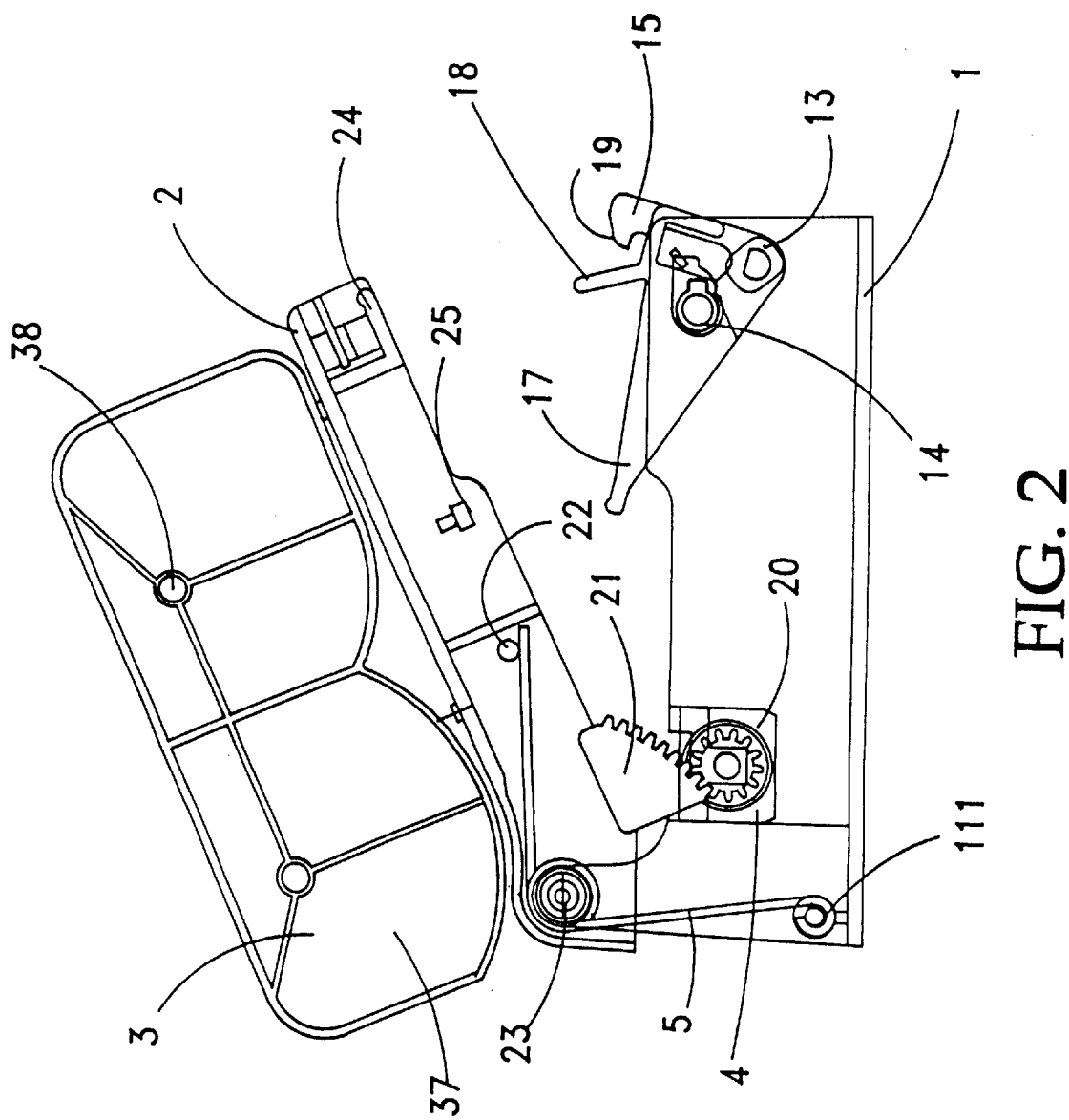
FIG. 2 is another side plain view of the present invention, showing the bar code printing device opened.

Referring to FIGS. 1, 2, 3, and 3A, a bar code printing device in accordance with the present invention is generally comprised of a base frame 1, a cover 2, and a ribbon reel mount 3. The cover 2 is pivotably connected to the base frame 1 by a pivot 23. Two torsional springs 5 bilaterally mounted around the pivot 23, each having one end secured to a post 111 in the base frame 1 and an opposite end connected to a post 22 in the cover 2. The torsional springs 5 impart an outward pressure to the cover 2, causing the cover 2 to be maintained in an open position as shown in FIG. 2. The base frame 1 comprises a horizontal axle 12 at the front side, two hooks 15 respectively and pivotably connected to the horizontal axle 12 at two opposite ends by a respective connector 13. Each of the hooks 15 has a sloping guide face 19. A lever 17 and a guide block 19 are fastened to one end of the horizontal axle 12 adjacent to one hook 15. The cover 2 comprises two retainer rods 24 bilaterally disposed at the front side corresponding to the hooks 15 of the base frame 1, and a press block 25 corresponding to the lever 17. Spring means (not shown) are provided to hold the hooks 15 in a fixed position. When the cover 2 is closed on the base frame 1, the lever 17 is forced downwards by the press block 25, causing the retainer rods 24 to be guided by the guide blocks 18 over the sloping guide faces 15 into engagement with the hooks 15 respectively.

As indicated, the torsional springs 5 impart an outward pressure to the cover 2. When the hooks 15 are disengaged from the retainer rods 24, the cover 2 will be forced outwards from the base frame 1 by the springs 5 in a rush. In order to prevent this problem, buffer means 4 are installed to buffer the outward moving speed of the cover 2. The buffer means 4 comprises two gear wheels 20 bilaterally mounted in the base frame 1 near the rear side, and two sector gears 21 bilaterally mounted in the cover 2 and respectively meshed with the gear wheels 20.

The ribbon reel mount 3 is fastened to the cover 2 on the outside by screws, comprising a ribbon guide 31 at the bottom, two upright supports 37 at two opposite sides. A wheel 34 and a cushion 35 are respectively mounted on the upright supports 37 and facing each other for mounting a ribbon reel 6 (see also FIGS. 4A, 4B, and 4C). The cushion 35 is slidably mounted on an axle 39 at the inner side of one upright support 37, and supported on a spring 36. The spring 36 forces the cushion 35 outwards toward the wheel 34. A DC motor 32 is mounted on one upright support 37. A reducing gear 33 is coupled between the DC motor 32 and the wheel 34, for permitting the wheel 34 to be turned by the DC motor 32. A sticker reel 11 is mounted inside the base frame 1, and adapted for letting off printed sticker. A step motor 16 is mounted in the base frame 1, and controlled to turn the sticker reel 11. The step motor 16 and the DC motor 32 are controlled through a control circuit (not shown) to turn the ribbon reel 6 and the sticker roller 11, permitting the sticker (not shown) to be printed with the desired bar code through a thermal printing process.

Figure 4A:
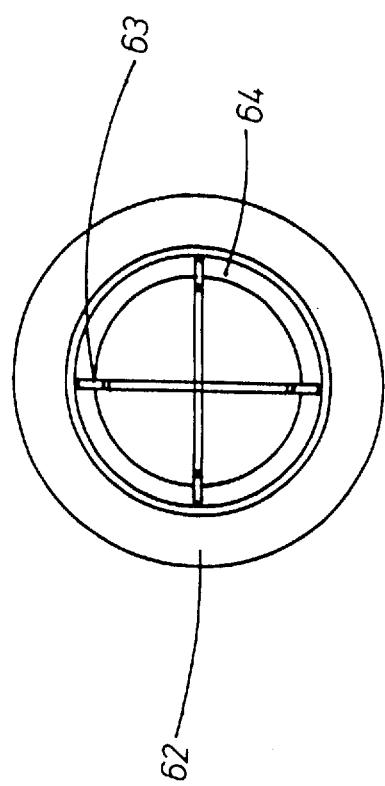
FIG. 4A is an end view of a ribbon reel according to the present invention, showing the structure of the second coupling thereof.
Figure 4B:
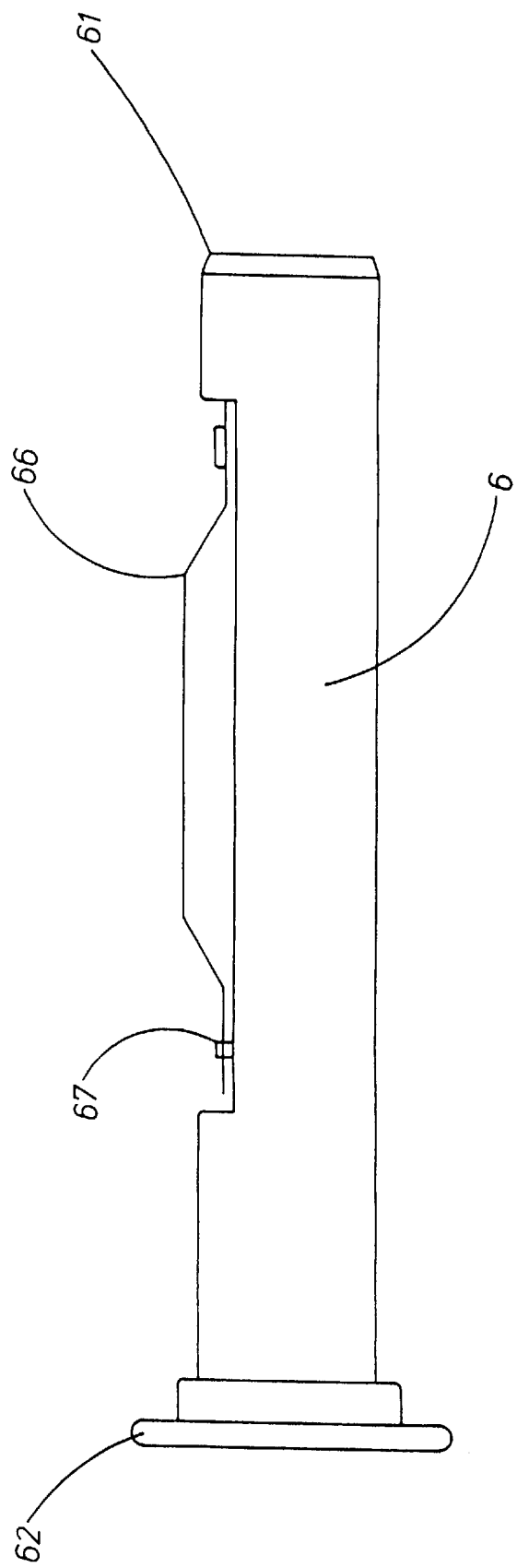
FIG. 4B is side view of the ribbon reel shown in FIG. 4A.
Figure 4C:
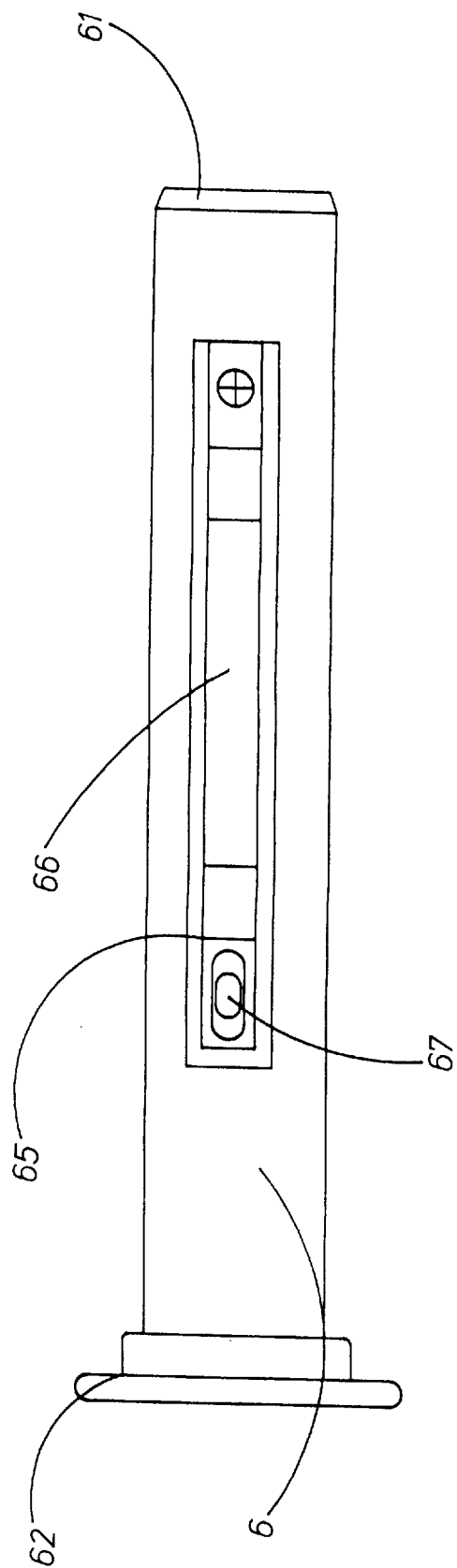
FIG. 4C is a top view of the ribbon reel shown in FIG. 4A.

Referring to FIGS. 4A, 4B, and 4C, the ribbon reel 6 fits ribbons of different specifications, comprising a first coupling 61 at one end adapted for coupling to the wheel 34, a second coupling 62 at an opposite end adapted for coupling to the cushion 35, a longitudinal recess 65, a stub rod 67 at one end of the longitudinal recess 65, and a tension spring 66 having one end fixedly secured to one end of the longitudinal recess 65, and an opposite end coupled to the stub rod 67 through a slip joint. The tension spring 66 can be compressed inwards to regulate the outer diameter of the ribbon reel 6 subject to the diameter of the ribbon loaded. Each of the couplings 61, 62 has a plurality of ribs 63. The second coupling 62 further comprises an annular flange 64 around the ribs 63. When the first coupling 61 of the ribbon reel 6 is coupled to the wheel 34, the ribs 63 of the first coupling 61 are respectively forced into the mounting holes 38 in the wheel 34 (see FIG. 3). Therefore, the ribbon reel 6 can be easily mounted on the ribbon reel mount 3 and supported between the wheel 34 and the cushion 35.

While only one embodiment of the present invention has been shown and described, it will be understood that various modifications and changes could be made thereunto without departing from the spirit and scope of the invention disclosed.

What the invention claimed is:

1. A bar code printing device comprising:

a base frame, said base frame comprising a horizontal pivot at a rear side thereof, a sticker reel horizontally disposed near a front side thereof, a step motor controlled to turn said sticker reel in letting off a sticker for printing, an axle horizontally at the front side, two spring-supported hooks pivoted to two opposite ends of said axle, and a guide block mounted on said axle adjacent to one spring-supported hook;

a cover turned about the horizontal pivot of said base frame and adapted for covering on said base frame, said cover comprising two retainer rods bilaterally disposed near a front side thereof for engagement with said spring-supported hooks, and a press block adapted for pressing on the lever of said base frame to turn said axle for permitting said retainer rods to be guided by said guide block into engagement with said spring-supported hooks;

spring means mounted between said base frame and said cover to force said cover outwards from said base frame;

buffer means mounted between said base frame and said cover to buffer the spring force of said spring means;

a ribbon reel mount fixedly secured to said cover on the outside by screws, said ribbon reel mount comprising a bottom ribbon guide, two upright supports at two opposite sides, a wheel and a spring-supported cushion respectively mounted on said upright supports and facing each other for mounting a ribbon reel, said spring-supported cushion sliding on a post at one upright support, a DC motor, and a reducing gear coupled between said DC motor and said wheel for permitting said wheel to be turned by said DC motor to rotate a ribbon reel; and a ribbon reel mounted on said ribbon reel mount between said wheel and said cushion for the loading of a ribbon for printing a bar code on the sticker being let off from said sticker reel, said ribbon reel comprising a first coupling at one end adapted for coupling to said wheel of said ribbon reel mount, a second coupling at an opposite end adapted for coupling to said spring-supported cushion of said ribbon reel mount, a longitudinal recess, and a tension spring mounted in said longitudinal recess and adapted for adjusting the diameter of said ribbon reel to fit the ribbon loaded thereon.

2. The bar code printing device of claim 1 wherein said spring means comprises two torsional springs mounted around said horizontal pivot of said base frame near two opposite ends, each torsional spring having one end connected to a post in said base frame and an opposite end connected to a post in said cover.

3. The bar code printing device of claim 1 wherein each of said spring-supported hooks has a sloping guide face adapted for guiding said retainer rods of said cover into engagement with said spring-supported hooks.

4. The bar code printing device of claim 1 wherein said buffer means comprises two gear wheels bilaterally mounted in said base frame near its rear side, and two sector gears bilaterally mounted in said cover and respectively meshed with said gear wheels.

5. The bar code printing device of claim 1 wherein said tension spring has one end fixedly secured to one end of said longitudinal recess, and an opposite end coupled to a stub rod at an opposite end of said longitudinal recess through a slip joint.

* * * * *